United States Patent
Kubota

(10) Patent No.: US 9,439,108 B2
(45) Date of Patent: Sep. 6, 2016

(54) MANAGEMENT METHOD, MANAGEMENT NODE, COMMUNICATION SYSTEM, AND RECORDING MEDIUM FOR PROGRAM

(75) Inventors: Mitsuhiro Kubota, Tokyo (JP); Akihiko Kubota, legal representative, Ehime (JP); Junko Kubota, legal representative, Ehime (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 14/342,145

(22) PCT Filed: Aug. 22, 2012
(Under 37 CFR 1.47)

(86) PCT No.: PCT/JP2012/071751
§ 371 (c)(1),
(2), (4) Date: Feb. 28, 2014

(87) PCT Pub. No.: WO2013/031791
PCT Pub. Date: Mar. 7, 2013

(65) Prior Publication Data
US 2014/0301369 A1    Oct. 9, 2014

(30) Foreign Application Priority Data

Sep. 1, 2011 (JP) .................................. 2011-190612

(51) Int. Cl.
*H04W 36/00* (2009.01)
*H04W 36/38* (2009.01)

(52) U.S. Cl.
CPC ..... *H04W 36/0061* (2013.01); *H04W 36/0083* (2013.01); *H04W 36/0072* (2013.01); *H04W 36/385* (2013.01)

(58) Field of Classification Search
CPC .................... H04W 36/0061; H04W 36/0083; H04W 36/385
See application file for complete search history.

(56) References Cited

U.S. PATENT DOCUMENTS

| 5,732,327 A | 3/1998 | Yoshimi et al. |
| 8,150,413 B2 | 4/2012 | Aoyama et al. |

(Continued)

FOREIGN PATENT DOCUMENTS

| JP | 8-237728 A | 9/1996 |
| JP | 9-219883 A | 8/1997 |

(Continued)

OTHER PUBLICATIONS

4G Americas, 'Self-Optimizing Networks: The Benefits of SON in LTE', Jul. 2011, pp. 1-69.*

(Continued)

*Primary Examiner* — Melvin Marcelo
(74) *Attorney, Agent, or Firm* — McGinn IP Law Group, PLLC

(57) ABSTRACT

In order to solve the problem that a handover failure rate of a mobile terminal becomes high in a case in which the number of the cells described in the adjacent cell list does not meet a specific condition, for example, a case in which many cells which have a small coverage area are included in the list, a case in which many highly loaded cells are included in the list, or the like, a management method includes a collection step in which information about a cell of a wireless base station is collected from the wireless base station which manages the cell and a list change step in which a list is changed based on the collected information about the cell so that the number of the cells described in the list of the cells adjacent to the wireless base station may meet a specific condition.

11 Claims, 10 Drawing Sheets

(56) References Cited

U.S. PATENT DOCUMENTS

| | | |
|---|---|---|
| 8,385,918 B2 | 2/2013 | Hashimoto |
| 2008/0070565 A1 | 3/2008 | Maeda |
| 2009/0005052 A1* | 1/2009 | Abusch-Magder ... H04W 24/02 455/446 |
| 2009/0047961 A1* | 2/2009 | Kim ................ H04W 36/0083 455/436 |
| 2009/0061871 A1* | 3/2009 | Gross ............... H04W 36/0061 455/436 |
| 2009/0088171 A1 | 4/2009 | Aoyama et al. |
| 2010/0323699 A1 | 12/2010 | Hashimoto |
| 2012/0083279 A1* | 4/2012 | Likar ............... H04W 36/0083 455/446 |
| 2012/0225646 A1 | 9/2012 | Mochida et al. |
| 2013/0316709 A1* | 11/2013 | Watanabe .......... H04W 24/02 455/435.2 |

FOREIGN PATENT DOCUMENTS

| | | | |
|---|---|---|---|
| JP | 2011-4101 A | 1/2011 | |
| SE | WO 2011031196 A1 * | 3/2011 | ............ H04W 16/18 |
| WO | WO 2006/054341 A1 | 5/2006 | |
| WO | WO 2007/060808 | 5/2007 | |
| WO | WO 2011/055696 A1 | 5/2011 | |

OTHER PUBLICATIONS

International Search Report (ISR) (PCT Form PCT/ISA/210), in PCT/JP2012/071751, dated Oct. 9, 2012.

3rd Generation Partnership Project; Technical Specification Group Radio Access Network; Evolved Universal Terrestrial Radio Access (E-UTRA); Requirements for support of radio resource management (Release 10) 3GPP TS 36.133 V10.1.0 (Dec. 2010).

3rd Generation Partnership Project; Technical Specification Group Radio Access Network; Evolved Universal Terrestrial Radio Access (E-UTRA); Radio Resource Control (RRC); Protocol specification (Release 10) 3GPP TS 36.331 V10.0.0 (Dec. 2010).

3rd Generation Partnership Project; Technical Specification Group Radio Access Network; Evolved Universal Terrestrial Radio Access Network (E-UTRAN);X2 application protocol (X2AP)(Release 10) 3GPP TS 36.423 V10.0.0 (Dec. 2010).

* cited by examiner

Fig.6

MANAGEMENT TABLE 105

| CELL NUMBER | COVERAGE AREA | RELAY BASE STATION CELL UNDER MANAGEMENT |
|---|---|---|
| #a | LARGE | #e |
| #b | LARGE | #e |
| #c | LARGE | #e |
| #d | SMALL | — |
| #e | LARGE | — |
| #f | SMALL | — |
| ... | ... | ... |
| ... | ... | ... |

Fig.7

ADJACENT CELL LIST 103

| CELL NUMBER | NUMBER OF TIMES OF HANDOVER | HANDOVER SUCCESS RATE | COVERAGE AREA | LOAD ON CELL |
|---|---|---|---|---|
| #a | 10000 | 0.9 | LARGE | HIGH |
| #b | 30000 | 0.2 | LARGE | LOW |
| #c | 4000 | 0.9 | LARGE | HIGH |
| #d | 5000 | 0.6 | SMALL | HIGH |
| #e | 7000 | 0.3 | SMALL | HIGH |
| #f | 20000 | 0.1 | LARGE | LOW |
| ... | ... | ... | ... | ... |
| ... | ... | ... | ... | ... |

Fig.10

ADJACENT CELL LIST 103

| CELL NUMBER | NUMBER OF TIMES OF HANDOVER | HANDOVER SUCCESS RATE | COVERAGE AREA | LOAD ON CELL |
|---|---|---|---|---|
| #a | 10000 | 0.9 | LARGE | HIGH |
| #b | 30000 | 0.2 | LARGE | LOW |
| #c | 4000 | 0.9 | LARGE | HIGH |
| #d | 5000 | 0.6 | SMALL | HIGH |
| #f | 20000 | 0.1 | LARGE | LOW |
| #e | 7000 | 0.3 | SMALL | HIGH |
| ... | ... | ... | ... | ... |
| ... | ... | ... | ... | ... |

MANAGEMENT METHOD, MANAGEMENT NODE, COMMUNICATION SYSTEM, AND RECORDING MEDIUM FOR PROGRAM

TECHNICAL FIELD

The present invention relates to a management method for managing a communication device, a management node, a communication system and a recording medium for program.

BACKGROUND ART

LTE (Long Term Evolution) is one of the wireless communication standards standardized by 3GPP (3rd Generation Partnership Project). In LTE, Single Carrier Access (SC-FDMA) is adopted as a wireless access scheme for an uplink. Further, in LTE, Orthogonal Frequency Multiple Access (OFDMA) is adopted as a wireless access scheme for a downlink.

A feature of OFDMA is that frequency orthogonality is used. In OFDMA, a plurality of carrier waves (sub carriers) are multiplexed. For this reason, it is said that the OFDMA scheme has better immunity to fading and multipath interference.

A feature of SC-FDMA is similar to that of OFDMA. The difference between SC-FDMA and OFDMA is that in SC-FDMA, a carrier wave assigned to a user is continuous. By this feature, in SC-FDMA, it is expected that the power efficiency of the uplink can be improved compared to OFDMA.

An uplink wireless resource provided in LTE is divided into two components: a frequency component and a time component. The divided wireless resource is assigned to the user.

A relay base station for LTE is specified in Non-patent document 1, non-patent document 2 and non-patent document 3. The relay base station is connected to a wireless base station by an Un link to configure a cell. In particular, among the wireless base stations, the wireless base station which accommodates the relay base station is called a Donner eNodeB (DeNB). The DeNB transfers data between a core network and the relay base station.

When a mobile terminal connected to the network moves from a connected cell to another cell, the mobile terminal changes the serving cell. This process is called handover.

At this time, in order to reduce the load on the mobile terminal and perform a handover at a high speed, a procedure in which a candidate of a handover destination cell is limited to a specific cell among the adjacent cells is generally used. Here, a list of the candidates for the handover destination cell is called an adjacent cell list.

A communication common carrier or an administrator of a network registers the cell for each cell to make the adjacent cell list. Further, the adjacent cell list is transmitted to the mobile terminal from the wireless base station which manages the cell via the downlink.

A priority of each cell is determined in the adjacent cell list. The priority shown in the adjacent cell list is generally determined based on the number of implementation times of the handover and a success rate of the handover. The priority of the adjacent cell is determined so that the adjacent cell of which the number of implementation times of the handover is large and the success rate of the handover is high may have higher priority. On the other hand, after the cell is added in the adjacent cell list, the cell of which the handover does not occur or the cell of which a failure of the handover tends to occur even when the number of implementation times of the handover is large is deleted from the adjacent cell list at the time of the next update of the list.

Further, the wireless base station monitors a load status of the cell. The load status is indicated by information about a usage rate of Physical Resource Block (PRB), the load on hardware, the load on a backhaul link, and information of the load on the whole wireless base station, or the like. In non-patent document 1, a method by which the adjacent wireless base stations transmit the information about the load status on each cell to each other is specified.

Further, the wireless base station collects a movement history of the mobile terminal. The movement history is included in a message that notifies of the handover. In non-patent document 1, a method for transmitting the movement history of the mobile terminal between the wireless base stations is specified. Specifically, the movement history is notified by UE (User Equipment) History Information included in Handover Request. This UE History Information can store information about the coverage area of the cell together with a cell ID. As a result, the wireless base station can obtain information about the coverage area of the surrounding cell.

The above-mentioned wireless network has been composed of mainly a macro wireless base station. Because the macro wireless base station has a large coverage area, the number of the wireless base stations installed by the communication common carrier has been small. However, in recent years, because the number of the mobile terminals which frequently connect to the Internet such as a smart phone and the like increases, many wireless base stations have to be installed. As a result, the number of the communication common carriers which plan to install a pico cell which has a small coverage area or the relay base station in addition to the macro wireless base station increases. As a result, because the number of the cells adjacent to one cell increases, it became difficult to make the adjacent cell list manually.

Further, as the related art, one example of a technology by which the cell of the wireless base station or the relay base station is set is described in patent document 1. In patent document 2, a technology by which an antenna angle is set so that the traffic between the cells may be dispersed is described.

PRIOR ART DOCUMENT

Patent Document

[Patent document 1] Republication WO 2006/054341 official bulletin
[Patent document 2] Republication WO 2007/060808 official bulletin

Non-Patent Document

[Non-patent document 1] 3GPP Technical Specification 36.423 Release 10.0.0
[Non-patent document 2] 3GPP Technical Specification 36.331 Release 10.0.0
[Non-patent document 3] 3GPP Technical Specification 36.133 Release 10.1.0

SUMMARY OF THE INVENTION

Technical Problem

There is a case in which when the adjacent cell list mentioned above is automatically made, the coverage area of the cell or the load on the cell is adopted as an index of priority of the cell in addition to the number of implementation times of the handover and the success rate of the handover mentioned above.

Generally, when many cells which have a small coverage area such as a pico cell, the relay base station, and the like are included in the adjacent cell list, the probability that the mobile terminal moving at high speed fails to perform the handover is high.

Further, when many highly loaded cells are included in the adjacent cell list, there is a high possibility that the lack of resources of the handover destination cell occurs when the mobile terminal performs handover to the highly loaded cell.

Accordingly, in a case in which the number of the cells described in the adjacent cell list does not meet a specific condition, for example, a case in which many cells which have a small coverage area are included in the list, a case in which many highly loaded cells are included in the list, or the like, there was a problem in which a failure rate of the handover of the mobile terminal becomes high.

An object of the present invention is to provide a management method, a management node, a communication system, and a recording medium for program which can solve the above-mentioned problem.

Solutions to Problem

A management method according to the present invention includes the steps of: collecting information about a cell of a wireless base station from the wireless base station which manages the cell and changing a list based on the collected information about the cell so that the number of the cells described in the list of the cells adjacent to the wireless base station may meet a specific condition.

A management node according to the present invention is a management node connected to a wireless base station which manages a cell and comprises collection means for collecting information about the cell of the wireless base station from the wireless base station and list change means for changing a list based on the collected information about the cell so that the number of the cells described in the list of the cells adjacent to the wireless base station may meet a specific condition.

A communication system according to the present invention including a wireless base station which manages a cell and a management node connected to the wireless base station characterized in that the management node includes collection means for collecting information about the cell of the wireless base station from the wireless base station and list change means for changing a list based on the collected information about the cell so that the number of the cells described in the list of the cells adjacent to the wireless base station may meet a specific condition.

A recording medium for program according to the present invention records a program which causes a computer to execute a collection process in which information about a cell of a wireless base station is collected from the wireless base station which manages the cell and a list change process in which a list is changed based on the collected information about the cell so that the number of the cells described in the list of the cells adjacent to the wireless base station may meet a specific condition.

ADVANTAGE EFFECT OF THE INVENTION

According to the present invention, even when the number of the cells described in the adjacent cell list does not meet a specific condition, for example, a case in which many cells which have a small coverage area are included in the list, a case in which many highly loaded cells are included in the list, or the like, the success rate of the handover of the mobile terminal can be improved.

DESCRIPTION OF EMBODIMENTS

The exemplary embodiment of the present invention will be described below with reference to a drawing.

<First Exemplary Embodiment>

Figure 1:
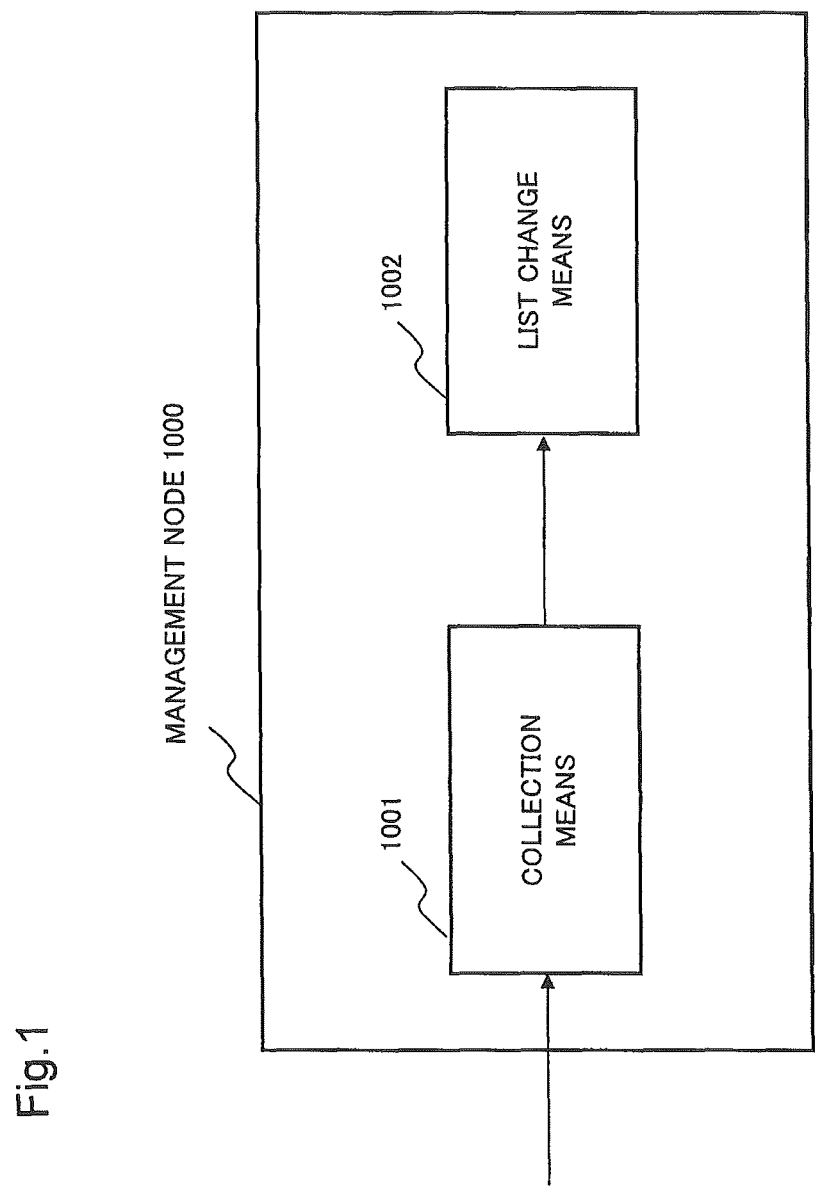
FIG. 1 A figure showing a management node according to a first exemplary embodiment FIG. 2 A flowchart showing a process according to a first exemplary embodiment FIG. 3 A figure showing a communication system according to a second exemplary embodiment FIG. 4 A figure showing a management node according to a second exemplary embodiment FIG. 5 A figure showing determination means according to a second exemplary embodiment FIG. 6 A figure showing a management table according to a second exemplary embodiment FIG. 7 A figure showing an adjacent cell list according to a second exemplary embodiment FIG. 8 A flowchart showing a process according to a second exemplary embodiment FIG. 9 A flowchart showing a process according to a second exemplary embodiment FIG. 10 A figure showing an adjacent cell list according to a second exemplary embodiment

FIG. 1 shows a management node 1000 according to a first exemplary embodiment. The management node 1000 is connected to a wireless base station (not shown). Incidentally, the wireless base station manages a cell.

Figure 2:
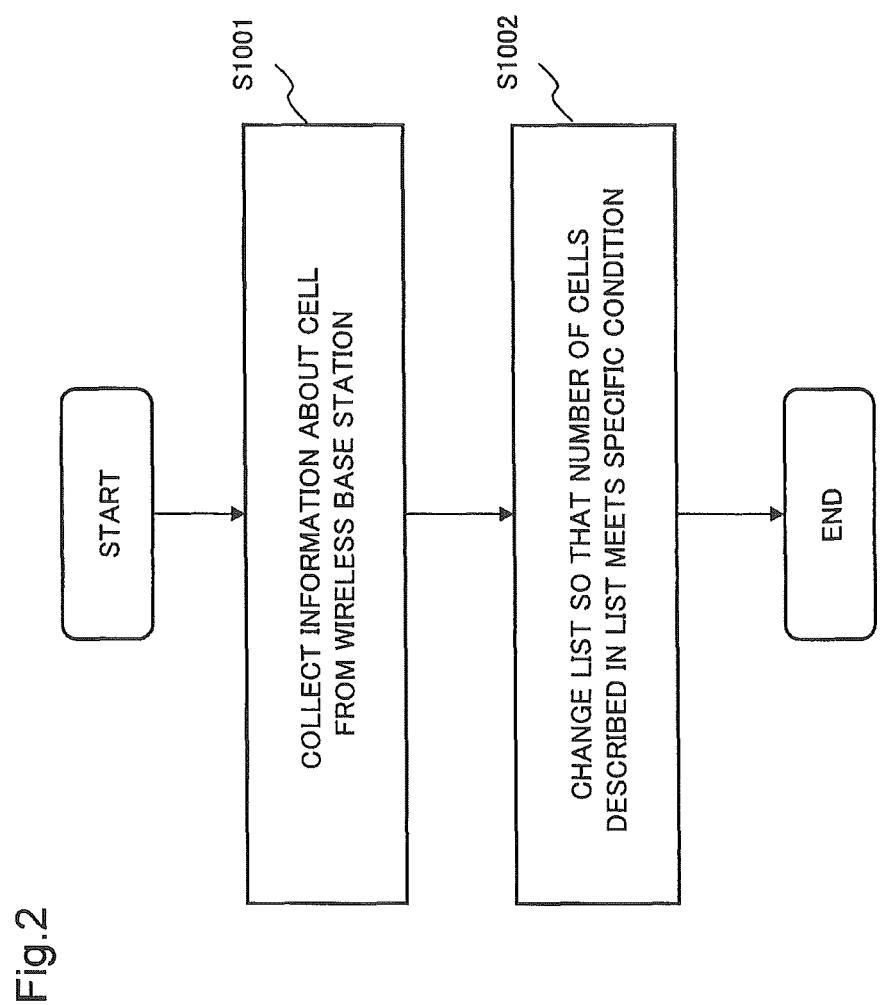

Referring to FIG. 1, the management node 1000 includes collection means 1001 and list change means 1002. Operation of this management node 1000 will be described below by using a flowchart shown in FIG. 2.

First, the collection means 1001 collects information about the cell managed by the wireless base station from the wireless base station (S1001).

The list change means 1002 changes a list based on the information about the cell collected by the collection means 1001 so that the number of the cells described in the list of the cells adjacent to the wireless base station may meet a specific condition (S1002).

Incidentally, although it is explained above that the management node 1000 performs the operations of the steps S1001 and S1002, the operations are not limited to this explanation. Another communication device, the wireless base station, or the like other than the management node 1000 may have the function of the management node 1000 mentioned above.

(Effect)

As described above, the management node 1000 according to the first exemplary embodiment changes the list so that the number of the cells described in the list may meet the specific condition.

Accordingly, by using the first exemplary embodiment, even in a case in which the number of the cells described in the adjacent cell list does not meet a specific condition, for example, a case in which many cells which have a small coverage area are included in the list, a case in which many highly loaded cells are included in the list, or the like, the success rate of the handover of the mobile terminal can be improved.

<Second Exemplary Embodiment>

(System Configuration)

Figure 3:
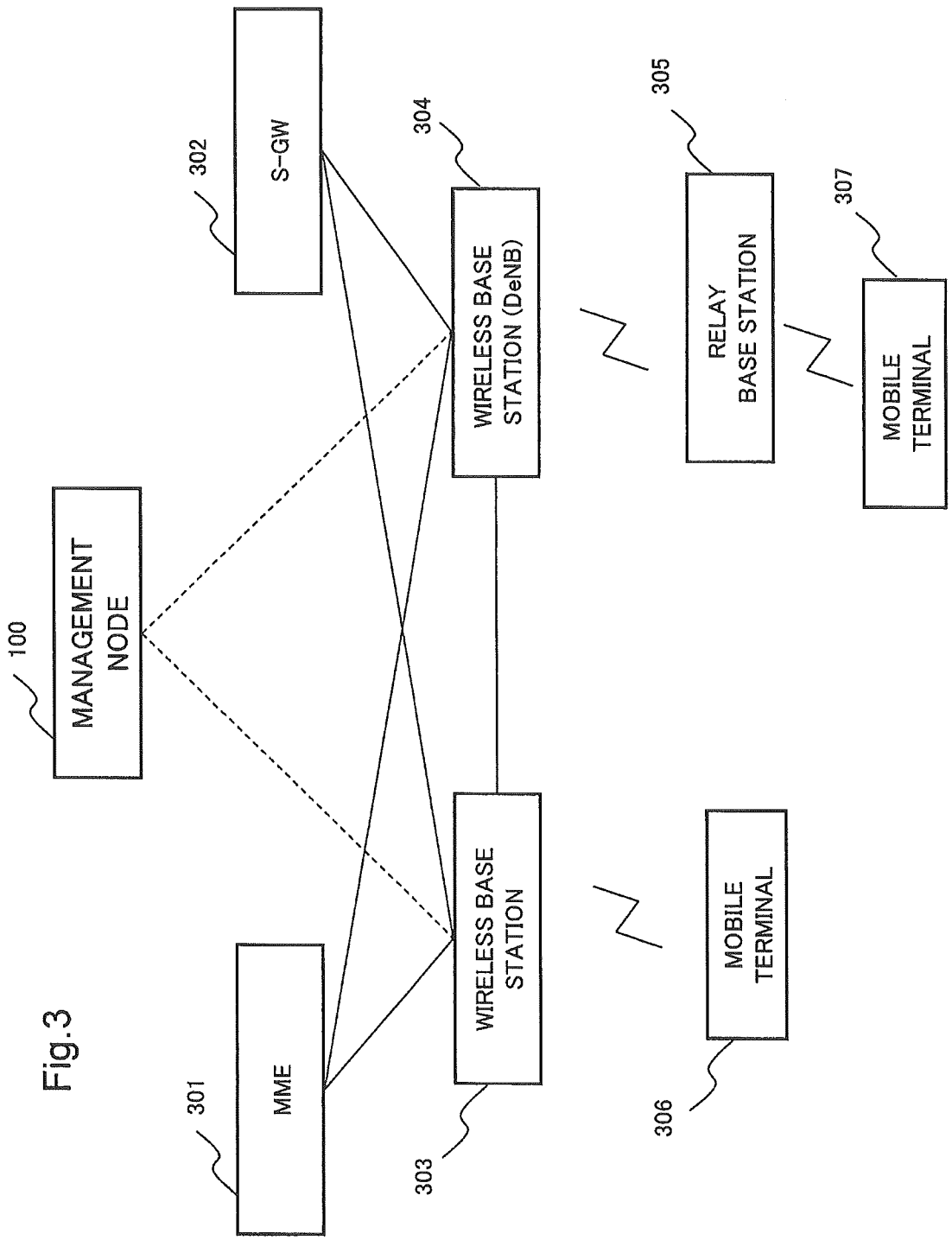

FIG. 3 shows a communication system according to a second exemplary embodiment. Referring to FIG. 3, the communication system includes a management node 100, an MME (Mobility Management Entity) 301, an S-GW (Saving-Gateway) 302, a wireless base station 303 and a wireless base station 304. The communication system further includes a relay base station 305, a mobile terminal 306, and a mobile terminal 307.

Hereinafter, the wireless base station 303 and the wireless base station 304 are simply called the wireless base station when distinction between the wireless base station 303 and the wireless base station 304 is not required.

Although any kind of network can be used for configuring the communication system shown in FIG. 3, a network using LTE is taken as an example for explanation below.

First, the MME 301 has a function to transmit/receive a control signal to/from the wireless base station via an S1-MME link.

The S-GW 302 has a function to transmit/receive user data to/from the wireless base station via an S1-U link.

Each of the wireless base stations manages a cell. Further, the wireless base station can accommodate the relay base station. In FIG. 3, the wireless base station 304 accommodates the relay base station 305. The wireless base station 304 which accommodates the relay base station 305 is called a DeNB. The wireless base stations are connected through an X2 link.

Further, the wireless base station 304 and the relay base station 305 are connected through a Un link. The wireless base station has a function to transfer data between the MME 301/the S-GW 302 and the relay base station 305. The data transferred between the MME 301/the S-GW 302 and the relay base station 305 is transmitted through an S11 link.

The management node 100 is connected to the wireless base station 303, makes the adjacent cell list, and instructs the wireless base station and the relay base station 305 to update the adjacent cell list. Further, the management node 100 has a function to collect information about a coverage area, information indicating whether the station is the relay base station, and information about the load on the cell from the wireless base station and the relay base station 305. This management node 100 will be described later in detail.

Further, although each device shown in FIG. 3 has many functions other than the above-mentioned function, the detailed explanation of these functions is omitted.

(Configuration of the Management Node)

Figure 4:
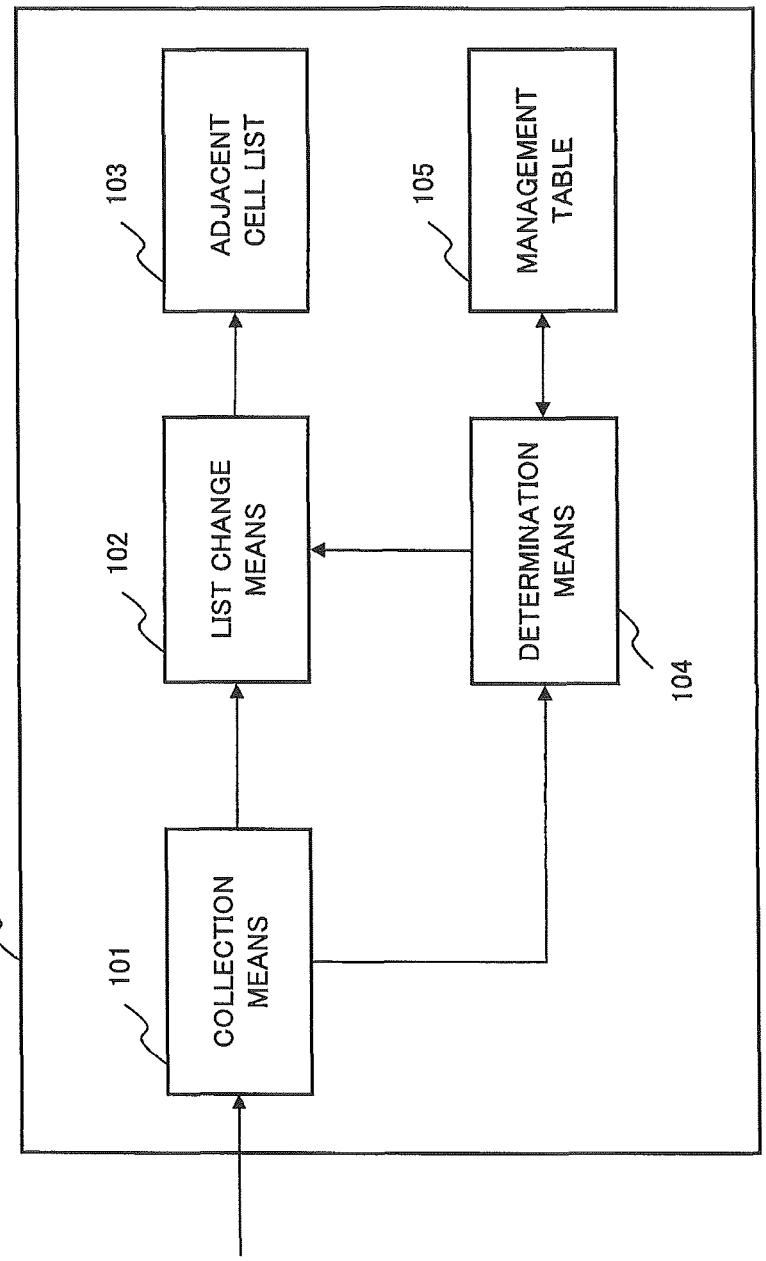

FIG. 4 is a figure showing a configuration of the management node 100. Referring to FIG. 4, the management node 100 includes collection means 101, list change means 102, an adjacent cell list 103, determination means 104 and a management table 105.

The collection means 101 collects information about the cell managed by the wireless base station from the wireless base station. The information about the cell includes a size of the coverage area of the cell, the load on the cell, and the like.

When the determination means 104 determines that the adjacent cell list 103 has to be changed, the list change means 102 changes the adjacent cell list 103.

The adjacent cell list for each wireless base station managed by the management node 100 is stored in the adjacent cell list 103.

The determination means 104 determines whether the adjacent cell list 103 has to be changed based on the information about the cell collected by the collection means 101. This determination means 104 will be described later in detail.

The information about each cell of the wireless base station managed by the management node 100 is stored in the management table 105.

Figure 5:
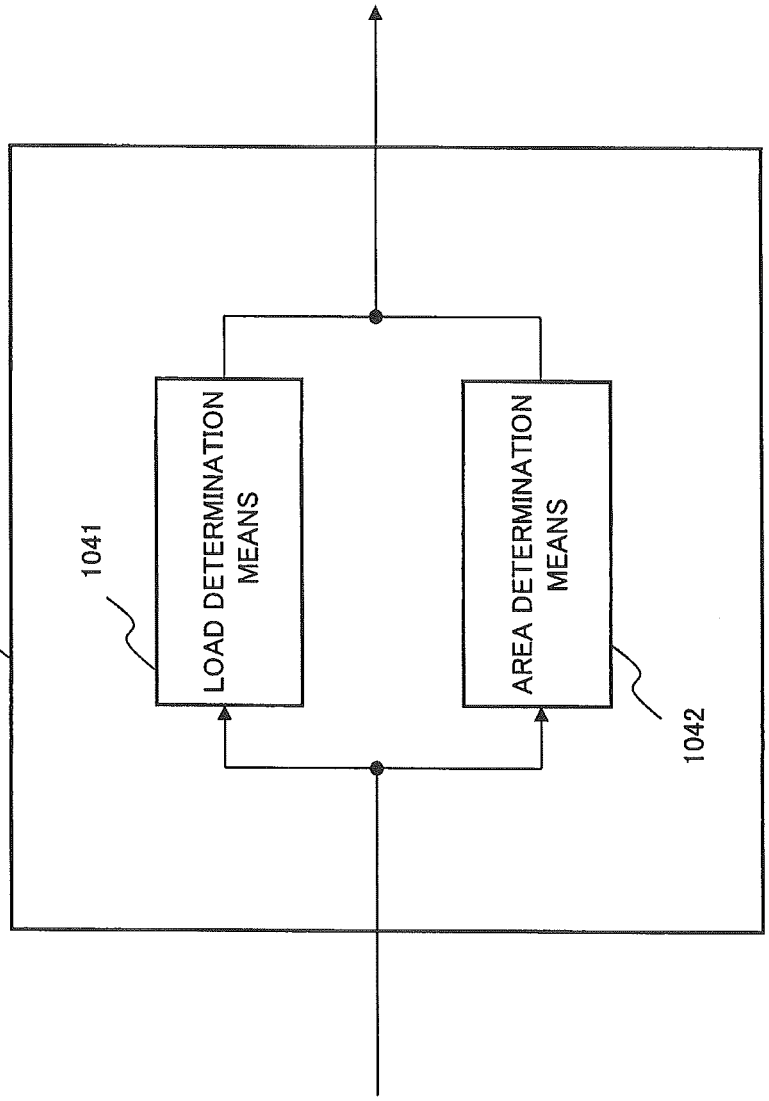

Next, the configuration of the determination means 104 will be described with reference to FIG. 5. Referring to FIG. 5, the determination means 104 includes load determination means 1041 and area determination means 1042.

The load determination means 1041 determines whether or not the load on each cell described in the adjacent cell list 103 exceeds a threshold value.

In this case, the list change means 102 changes the adjacent cell list 103 so that the number of the cells of which each of loads is determined as exceeding the threshold value may not exceed the threshold value.

The area determination means 1042 determines whether the coverage area of each cell described in the adjacent cell list 103 is large or small. Whether the coverage area is large or small can be determined by, for example, based on whether or not the area of the coverage area of each cell exceeds a threshold value of the area of the coverage area.

In this case, the list change means 102 changes the adjacent cell list 103 so that the number of the cells of which each of coverage areas is determined being small may not exceed the threshold value.

Incidentally, one of the process performed by the load determination means 1041 and the process performed by the area determination means 1042 may be performed severally or both the processes may be performed concurrently.

FIG. 6 is a figure showing the management table 105 in detail. The management table 105 stores a cell ID and a result of the determination of the coverage area size of each cell managed by the management node 100. Further, when the wireless base station which manages the cell accommodates the relay base station, the management table 105 stores the cell of the accommodated relay base station. Alternatively, the management table 105 may store topology information on the wireless base station which accommodates the relay base station and the relay base station. In an example shown in FIG. 6, the wireless base station 304 which manages three cells: a cell with cell ID #a, a cell with cell ID #b and a cell with cell ID #c is associated with a cell with cell ID #e managed by the accommodated relay base station 305 and the information of the association is stored in the management table 105. Incidentally, the wireless base station which manages a cell with cell ID #d and a cell with cell ID #f is the wireless base station 303.

FIG. 7 shows the adjacent cell list 103 in detail. The adjacent cell list 103 stores the number of implementation times of the handover, the success rate of the handover performed to the cell ID of each cell, the size of the coverage area and the size of the load on the cell.

In an example shown in FIG. 7, the greater the value calculated by multiplying the number of times of the handover by the handover success rate for each cell rises, the higher the priority rises. In an example shown in FIG. 7, the cell is arranged in decreasing order of the calculated value (priority).

(Operation)

Next, the operation of the communication system according to the second exemplary embodiment will be described by using FIG. 8.

Figure 8:
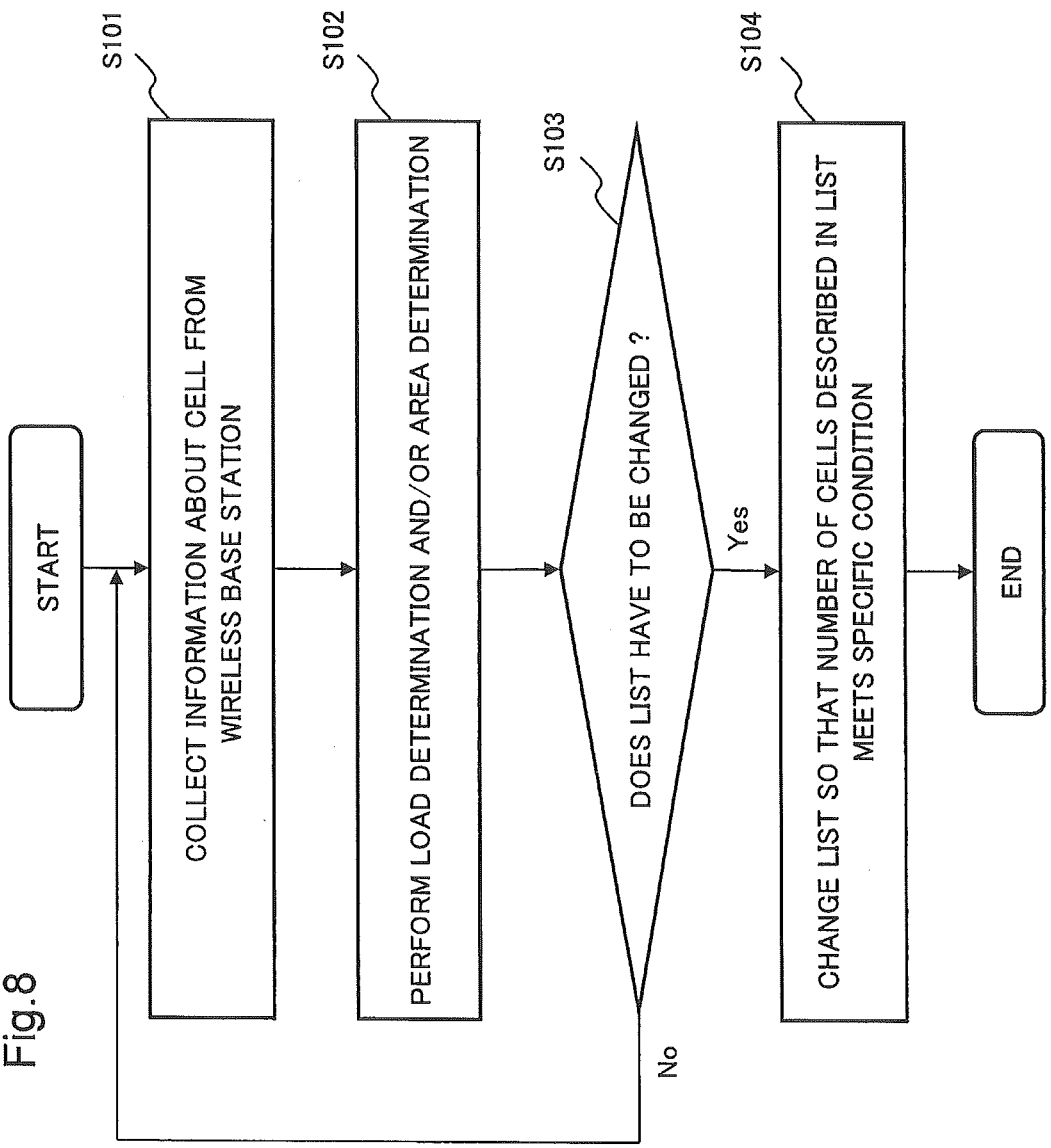

FIG. 8 is a flowchart showing the operation of the communication system according to the second exemplary embodiment. Incidentally, the operations of steps S102, S103, and S104 will be described later in detail by using a specific example.

First, the collection means 101 collects the information about the adjacent cell from the wireless base station which makes the adjacent cell list among the wireless base stations managed by the management node 100 (S101). For example, the information about the coverage area of the cell set to the wireless base station, the information about the load on the cell and the information indicating whether or not the wireless base station is the relay base station are used as the collected information. When the wireless base station is the relay base station, the wireless base station notifies the management node 100 of the DeNB of the relay base station. The management node 100 associates information indicating the level of the load on the cell and the area size such as the area of the coverage area of the cell or the like with the cell ID and stores the information in the management table 105 and the adjacent cell list 103. Further, with respect to the DeNB, the topology information indicating a relationship with the relay base station is stored in the management table 105. The management node 100 periodically calculates the priority of each cell by multiplying the number of implementation times of the handover by the handover success rate and makes or updates the adjacent cell list 103 in which the cell is arranged in decreasing order of the value of the priority of the cell.

Incidentally, the collection means 101 may collect the information periodically or may collect the information at an arbitrary timing. Further, when the adjacent cell list 103 has already been made, the collection means 101 may update the adjacent cell list 103 periodically. Furthermore, when the number of times of the handover or the handover success rate of each cell that are stored in the adjacent cell list 103 is less than or equal to the threshold value set in advance, the collection means 101 may update the information.

Next, the determination means 104 determines whether the coverage area is large or small and whether the load on the cell is high or low for each cell described in the adjacent cell list 103 (S102). The process of determining the load on the cell is performed by the load determination means 1041. On the other hand, the process of determining the size of the coverage area of the cell is performed by the area determination means 1042. As described above, one of these two processes may be performed or both the processes may be performed concurrently.

Based on a result of the load determination process and the area determination process performed in step S102, the list change means 102 determines whether or not the adjacent cell list 103 has to be changed (S103). The list change means 102 determines whether or not the adjacent cell list 103 meets the specific condition set in advance. For example, when the number of the cells of which each of loads is determined as being high in step S102 or when the number of the cells of which each of coverage areas is determined as being small in step S102, the list change means 102 determines that the adjacent cell list 103 has to be changed.

More specifically, the management node 100 sets a threshold value "a" of the number of the cells which have small coverage area such as the pico cell, the relay base station and the like included in the adjacent cell list of the cells managed by the wireless base station. Further, the management node 100 sets a threshold value "b" of the number of the highly loaded cells included in the adjacent cell list.

As a result of the process of step S103, when it is determined that it is not necessary to change the adjacent cell list 103, the process returns to the process of step S101. On the other hand, as a result of the process of step S103, when it is determined that it is necessary to change the adjacent cell list 103, the list change means 102 changes the adjacent cell list 103 so that the number of the cells included in the adjacent cell list 103 may meet the specific condition set in advance (S104). For example, the list change means 102 changes the adjacent cell list 103 so that the number of the cells of which each of loads is determined as being high in step 102 may be less than or equal to the threshold value "a". Similarly, the list change means 102 changes the adjacent cell list 103 so that the number of the cells of which each of coverage areas is determined as small may be less than or equal to the threshold value "b".

Figure 9:
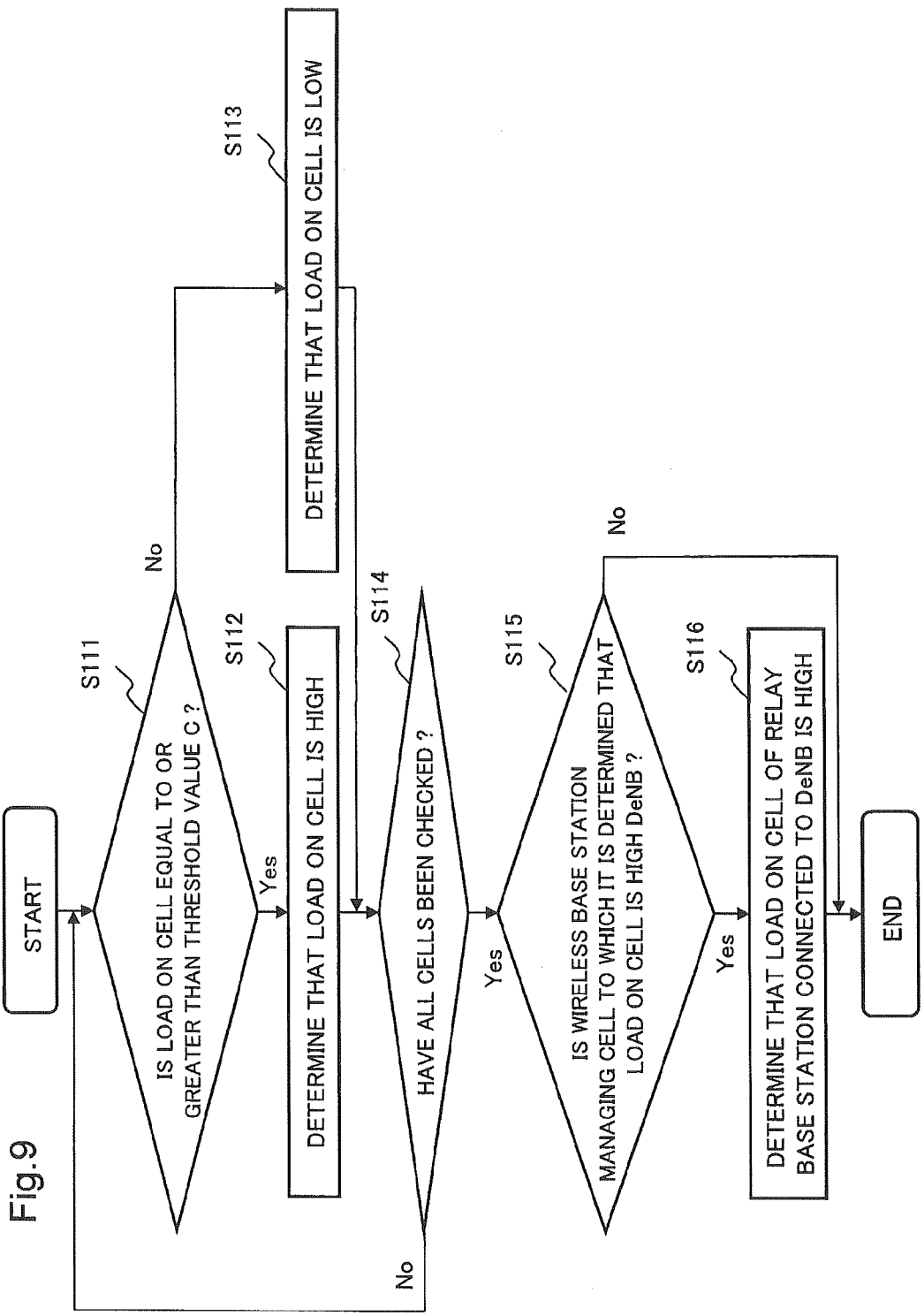

Next, the process of step S102 performed by the load determination means 1041 will be described in detail. FIG. 9 is a flowchart showing the load determination process of step S102 performed by the load determination means 1041 of the determination means 104.

First, the load determination means 1041 monitors the load on the cell that is set to the wireless base station managed by the management node 100. Here, the load determination means 1041 determines whether or not the load on each cell is higher than a threshold value "c" set in advance (S111). Further, the process of step S111 may be performed periodically.

As a result of the process of step S111, when the load on the cell is higher than the threshold value "c", the load determination means 1041 determines that the load on the cell is high (S112). Further, as a result of the process of step S111, when the load on the cell is equal to or lower than the threshold value "c", the load determination means 1041 determines that the load on the cell is low (S113).

The above-mentioned processes of the steps S111, S112, and S113 are performed repeatedly to all the cells set to the wireless base station managed by the management node 100 (S114).

When the load on the cell has been monitored for all the cells, the load determination means 1041 checks the cell of which each of loads is determined as being high again. With respect to the cell of which each of loads is determined as being high, the load determination means 1041 confirms whether or not the wireless base station managing the cell is the DeNB (S115).

As a result of the process of step S115, when the cell is managed by the DeNB, it is determined that the load on the cell of the relay base station connected to the DeNB is high and the process shown in FIG. 9 ends (S116). On the other hand, as a result of the process of step S115, when the cell is not managed by the DeNB, no process is performed to the cell which is not managed by the wireless base station that is the DeNB among the cells of which each of loads is determined as being high and the process shown in FIG. 9 ends. Incidentally, the process of step S116 is performed while the load determination means 1041 refers to the topology information on the wireless base station and the relay base station stored in the management table 105.

SPECIFIC EXAMPLE

Next, a specific example of a case in which the management node 100 changes the adjacent cell list 103 will described with reference to FIG. 7 and FIG. 10.

FIG. 7 is, as described above, one example of the adjacent cell list 103 made by the management node 100. The cells are listed in decreasing order of the values which are calculated by multiplying the number of implementation times of the handover by the handover success rate.

The load determination process and the area determination process are performed in step S102 and the result of these processes is reflected in the adjacent cell list 103 shown in FIG. 7.

In the process of step S103, the list change means 102 changes the adjacent cell list 103 so that two conditions of the threshold value "a" related to the number of the cells which have a small coverage area and of the threshold value "b" related to the number of the highly loaded cells may be satisfied.

FIG. 10 shows the adjacent cell list 103 in which the threshold value "a" and the threshold value "b" are met. Here, an example in which the threshold value "a" and the threshold value "b" are set to 3 is shown. In the adjacent cell list shown in FIG. 10, it is shown that two cells: the cell with cell ID #d and the cell with cell ID #e, have a small coverage area among the cells with cell IDs #a to #f and the number of the cells with small coverage area meets the condition defined by the threshold value "a". On the other hand, it is shown that four cells: the cell with cell ID #a, the cell with cell ID #c, the cell with cell ID #d, and the cell with cell ID #e are highly loaded cells and the load of these cells exceed the threshold value "b". Accordingly, the list change means 102 changes the adjacent cell list 103 so that the number of the highly loaded cells may be less than or equal to 3. In an example shown in FIG. 10, the list change means 102 temporarily deletes the cell with cell ID #e which has the lowest priority among the highly loaded cells. Alternatively, the list change means 102 may move the cell with cell ID #e to the lower position in the adjacent cell list 103 or may temporarily mask the cell with cell ID #e to inhibit the referencing.

(Effect)

As described above, the management node 100 according to the second exemplary embodiment changes the list so that the number of the cells described in the adjacent cell list 103 may meet the specific condition.

Accordingly, by using the second exemplary embodiment, even in a case in which the number of the cells described in the adjacent cell list 103 does not meet a specific condition, for example, a case in which many cells which have a small coverage area are included in the adjacent cell list 103, a case in which many highly loaded cells are included in the adjacent cell list 103 or the like, the handover success rate of the mobile terminal can be improved.

(Another Exemplary Embodiment)

One of the wireless base stations can have the function of the management node 1000 according to the first exemplary embodiment or the management node 100 according to the second exemplary embodiment. The wireless base station makes the adjacent cell list by using the information about the coverage area of the cell, the information indicating whether the station is the relay base station and the information about the load on the cell. The wireless base station collects the required information through the X2 link.

The invention of the present application has been described above with reference to the exemplary embodiment. However, the invention of the present application is not limited to the above-mentioned exemplary embodiment. Various changes in the configuration or details of the invention of the present application that can be understood by those skilled in the art can be made without departing from the scope of the invention.

The management node, the wireless base station, and the communication system according to the above-mentioned exemplary embodiment can be realized by hardware with the function of these devices or can be realized by a computer and a program executed by the computer. The program is recorded in a recording medium such as a magnetic disk, a semiconductor memory, or the like and provided and is read by the computer at the time of starting the computer or the like. Thus, the operation of the computer is controlled, the computer is functioned as the management node, the wireless base station, and the communication system according to above-mentioned each exemplary embodiment and the above-mentioned process is performed.

This application claims priority based on Japanese Patent Application No. 2011-190612 filed on Sep. 1, 2011, the disclosure of which is hereby incorporated by reference in its entirety.

Further, a part of or all of the above-mentioned exemplary embodiment can be described as the following supplementary note. However, the present invention is not limited to the following supplementary note.

(Supplementary Note 1)

A management method including:

a collection step for correcting information about a cell of a wireless base station from the wireless base station which manages the cell; and a list change step for changing a list based on the collected information about the cell so that the number of the cells described in the list of the cells adjacent to the wireless base station may meet a specific condition.

(Supplementary Note 2)

The management method described in supplementary note 1, wherein the information about the cell includes information about the load on the cell.

(Supplementary Note 3)

The management method described in supplementary note 2, further including a load determination step for determining whether or not the load of each cell described in the list exceeds a first threshold value, wherein the specific condition includes a condition that the number of the cells of which each of loads is determined as exceeding the first threshold value does not exceed a second threshold value.

(Supplementary Note 4)

The management method described in any one of supplementary notes 1 to 3, wherein the information about the cell includes information about an area of a coverage area of the cell.

(Supplementary Note 5)

The management method described in supplementary note 4 further including an area determination step for determining whether the coverage area of each cell described in the list is large or small, wherein the specific condition includes a condition in which the number of the cells of which each of coverage areas is determined as being small does not exceed a third threshold value.

(Supplementary Note 6)

The management method described in any one of supplementary notes 1 to 5, wherein the change in the list includes moving a cell which meets the specific condition among the cells described in the list to the higher position in the list.

(Supplementary Note 7)

The management method described in any one of supplementary notes 1 to 6, wherein the change in the list includes deleting a cell which does not meet the specific condition among the cells described in the list from the list.

(Supplementary Note 8)

The management method described in any one of supplementary notes 1 to 7, wherein:

in the collection step, load information about the cell is collected periodically; and the load information about the cell described in the list is updated.

(Supplementary Note 9)

The management method described in supplementary note 8, wherein in the collection step, when the number of successes of the handover of the cell described in the list is less than or equal to a fourth threshold value, the load information about the cell described in the list is updated.

(Supplementary Note 10)

The management method described in any one of supplementary notes 1 to 9, wherein:

in the collection step, area information on the coverage area of the cell is collected periodically; and the area information on the coverage area of the cell described in the list is updated.

(Supplementary Note 11)

The management method described in supplementary note 10, wherein in the collection step, when the number of successes of the handover of the cell described in the list is less than or equal to the fourth threshold value, the area information on the coverage area of the cell described in the list is updated.

(Supplementary Note 12)

A management node connected to a wireless base station which manages a cell, comprising:

collection means for collecting information about the cell of the wireless base station from the wireless base station; and list change means for changing a list based on the collected information about the cell so that the number of the cells described in the list of the cells adjacent to the wireless base station may meet a specific condition.

(Supplementary Note 13)

The management node described in supplementary note 12, wherein the information about the cell includes information about a load on the cell.

(Supplementary Note 14)

The management node described in supplementary note 13, further includes load determination means for determining whether or not the load of each cell described in the list exceeds a first threshold value and the specific condition includes a condition in which the number of the cells of which each of loads is determined as exceeding the first threshold value does not exceed a second threshold value.

(Supplementary Note 15)

The management node described in any one of supplementary notes 12 to 14, wherein the information about the cell includes information about an area of a coverage area of the cell.

(Supplementary Note 16)

The management node described in supplementary note 15, further includes area determination means for determining whether the coverage area of each cell described in the list is large or small and the specific condition includes a condition in which the number of the cells of which each of coverage areas is determined as being small does not exceed a third threshold value.

(Supplementary Note 17)

The management node described in any one of supplementary notes 12 to 16, wherein the change in the list includes moving a cell which meets the specific condition among the cells described in the list to the higher position in the list.

(Supplementary Note 18)

The management node described in any one of supplementary notes 12 to 17, wherein the change in the list includes deleting a cell which does not meet the specific condition among the cells described in the list from the list.

(Supplementary Note 19)

The management node described in any one of supplementary notes 12 to 18, wherein the collection means collects load information about the cell periodically and updates the load information about the cell described in the list.

(Supplementary Note 20)

The management node described in supplementary note 19, wherein the number of successes of the handover of the cell described in the list is less than or equal to a fourth threshold value, the collection means updates the load information about the cell described in the list.

(Supplementary Note 21)

The management node described in any one of supplementary notes 12 to 20, wherein the collection means collects area information on the coverage area of the cell periodically and updates the area information on the coverage area of the cell described in the list.

(Supplementary Note 22)

The management node described in supplementary note 21, wherein when the number of successes of the handover of the cell described in the list is less than or equal to the fourth threshold value, the collection means updates the area information on the coverage area of the cell described in the list.

(Supplementary Note 23)

A communication system comprising:

a wireless base station which manages a cell; and a management node connected to the wireless base station, wherein the management node includes:

collection means for collecting information about the cell of the wireless base station from the wireless base station; and list change means for changing a list based on the collected information about the cell so that the number of the cells described in the list of the cells adjacent to the wireless base station may meet a specific condition.

(Supplementary Note 24)

The communication system described in supplementary note 23, wherein the information about the cell includes information about a load on the cell.

(Supplementary Note 25)

The communication system described in supplementary note 24, wherein:

the management node further includes load determination means for determining whether or not the load on each cell described in the list exceeds a first threshold value; and the specific condition includes a condition in which the number of the cells of which each of loads is determined as exceeding the first threshold value does not exceed a second threshold value.

(Supplementary Note 26)

The communication system described in any one of supplementary notes 23 to 25, wherein the information about the cell includes information about an area of the coverage area of the cell.

(Supplementary Note 27)

The communication system described in supplementary note 26, wherein:

the management node further includes area determination means for determining whether the coverage area of each cell described in the list is large or small; and the specific condition includes a condition in which the number of the cells of which each of coverage areas is determined as being small does not exceed a third threshold value.

(Supplementary Note 28)

The communication system described in any one of supplementary notes 23 to 27, wherein the change in the list includes a change in the list in which the cell which meets the specific condition among the cells described in the list is moved to the higher position in the list.

(Supplementary Note 29)

The communication system described in any one of supplementary notes 23 to 28, wherein the change in the list includes a change in the list in which the cell which does not meet the specific condition among the cells described in the list is deleted from the list.

(Supplementary Note 30)

The communication system described in any one of supplementary notes 23 to 29, wherein the collection means collects load information about the cell periodically and updates the load information about the cell described in the list.

(Supplementary Note 31)

The communication system described in supplementary note 30, wherein when the number of successes of the handover of the cell described in the list is less than or equal to a fourth threshold value, the collection means updates the load information about the cell described in the list.

(Supplementary Note 32)

The communication system described in any one of supplementary notes 23 to 31, wherein the collection means collects area information on the coverage area of the cell periodically and updates the area information on the coverage area of the cell described in the list.

(Supplementary Note 33)

The communication system described in supplementary note 32, wherein when the number of successes of the handover of the cell described in the list is less than or equal to the fourth threshold value, the collection means updates the area information on the coverage area of the cell described in the list.

(Supplementary Note 34)

A program causing a computer to execute:

a collection process for collecting information about a cell of a wireless base station from the wireless base station which manages the cell; and a list change process for changing a list based on the collected information about the cell so that the number of the cells described in the list of the cells adjacent to the wireless base station may meet a specific condition.

(Supplementary Note 35)

The program described in supplementary note 34, wherein the information about the cell includes information about a load on the cell.

(Supplementary Note 36)

The program described in supplementary note 35, further includes:

a load determination process for determining whether or not the load on each cell described in the list exceeds a first threshold value; and the specific condition includes a condition in which the number of the cells of which each of loads is determined as exceeding the first threshold value does not exceed a second threshold value.

(Supplementary Note 37)

The program described in any one of supplementary notes 34 to 36, wherein the information about the cell includes information about an area of the coverage area of the cell.

(Supplementary Note 38)

The program described in supplementary note 37, further includes:

an area determination process for determining whether the coverage area of each cell described in the list is large or small; and the specific condition includes a condition in which the number of the cells of which each coverage areas is determined as being small does not exceed a third threshold value.

(Supplementary Note 39)

The program described in any one of supplementary notes 34 to 38, wherein the change in the list includes moving a cell which meets the specific condition among the cells described in the list to the higher position in the list.

(Supplementary Note 40)

The program described in any one of supplementary notes 34 to 39, wherein the change in the list includes deleting a cell which does not meet the specific condition among the cells described in the list from the list.

(Supplementary Note 41)

The program described in any one of supplementary notes 34 to 40, wherein in the collection process, load information about the cell is collected periodically and the load information about the cell described in the list is updated.

(Supplementary Note 42)

The program described in supplementary note 41, wherein in the collection process, when the number of successes of the handover of the cell described in the list is less than or equal to a fourth threshold value, the load information about the cell described in the list is updated.

(Supplementary Note 43)

The program described in any one of supplementary notes 34 to 42, wherein in the collection process, area information on the coverage area of the cell is collected periodically and the area information on the coverage area of the cell described in the list is updated.

(Supplementary Note 44)

The program described in supplementary note 43, wherein characterized in that when the number of successes of the handover of the cell described in the list is less than or equal to the fourth threshold value, the area information on the coverage area of the cell described in the list is updated.

REFERENCE SIGNS LIST 100, 1000 management node
101, 1001 collection means
102, 1002 list change means
103 adjacent cell list
104 determination means
105 management table
301 MME
302 S-GW
303 wireless base station
304 wireless base station (DeNB)
305 relay base station
306, 307 mobile terminal

1041 load determination means
1042 area determination means

The invention claimed is:

1. A management method comprising:
collecting information about a cell of a wireless base station from the wireless base station which manages the cell;
changing a list based on the collected information about the cell so that a number of the cells described in the list of the cells adjacent to the wireless base station may meet a specific condition,
wherein the information about the cell includes information about an area of the coverage area of the cell; and
determining whether the coverage area of each cell described in the list is large or small, wherein
the specific condition includes a condition in which the number of the cells of which each of coverage areas is determined as being small does not exceed a third threshold value.

2. The management method described in claim 1, wherein the information about the cell further includes information about a load on the cell.

3. The management method described in claim 2, further comprising determining whether or not the load on each cell described in the list exceeds a first threshold value, wherein
the specific condition includes a condition in which the number of the cells of which each of loads is determined as exceeding the first threshold value does not exceed a second threshold value.

4. The management method described in claim 1, wherein the change in the list includes moving a cell which meets the specific condition among the cells described in the list to the higher position in the list.

5. The management method described in claim 1, wherein the change in the list includes deleting a cell which does not meet the specific condition among the cells described in the list from the list.

6. The management method described in claim 1, wherein:
in the collecting, load information about the cell is collected periodically; and
the load information about the cell described in the list is updated.

7. The management method described in claim 6, wherein in the collecting, when the number of successes of the handover of the cell described in the list is less than or equal to a fourth threshold value, the load information about the cell described in the list is updated.

8. The management method described in claim 1, wherein:
in the collecting, area information on the coverage area of the cell is collected periodically; and
the area information on the coverage area of the cell described in the list is updated.

9. The management method described in claim 8, wherein in the collecting, when the number of successes of the handover of the cell described in the list is less than or equal to a fifth threshold value, the area information on the coverage area of the cell described in the list is updated.

10. A management node connected to a wireless base station which manages a cell, comprising:
a collection unit which collects information about the cell of the wireless base station from the wireless base station;
a list change unit which changes a list based on the collected information about the cell so that a number of the cells described in the list of the cells adjacent to the wireless base station may meet a specific condition,
wherein the information about the cell includes information about an area of the coverage area of the cell; and
a determining unit which determines whether the coverage area of each cell described in the list is large or small, wherein
the specific condition includes a condition in which the number of the cells of which each of coverage areas is determined as being small does not exceed a third threshold value.

11. A communication system comprising:
a wireless base station which manages a cell; and
a management node connected to the wireless base station, wherein
the management node includes:
a collection unit which collects information about the cell of the wireless base station from the wireless base station; and
a list change unit which changes a list based on the collected information about the cell so that a number of the cells described in the list of the cells adjacent to the wireless base station may meet a specific condition,
wherein the information about the cell includes information about an area of the coverage area of the cell; and
a determining unit which determines whether the coverage area of each cell described in the list is large or small, wherein
the specific condition includes a condition in which the number of the cells of which each of coverage areas is determined as being small does not exceed a third threshold value.

* * * * *